R. S. WICKS.
VEHICLE TIRE FILLER.
APPLICATION FILED JUNE 15, 1915.
1,186,153.
Patented June 6, 1916.
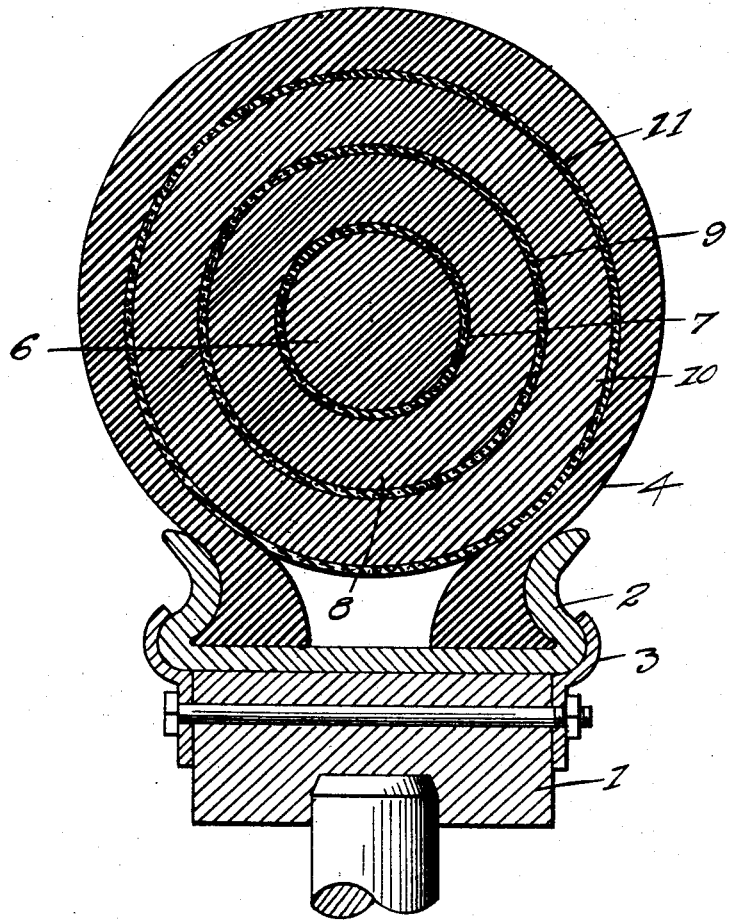
Witnesses
Inventor
R. S. Wicks.
By
Attorney

UNITED STATES PATENT OFFICE.

RAIDAR S. WICKS, OF MOUNT VERNON, WASHINGTON.

VEHICLE-TIRE FILLER.

1,186,153.   Specification of Letters Patent.   Patented June 6, 1916.

Application filed June 15, 1915. Serial No. 34,219.

*To all whom it may concern:*

Be it known that I, RAIDAR S. WICKS, a citizen of the United States, residing at Mount Vernon, in the county of Skagit and State of Washington, have invented certain new and useful Improvements in Vehicle-Tire Fillers; and I do hereby declare the following to be a full, clear, and exact description of the invention, such as will enable others skilled in the art to which it appertains to make and use the same.

This invention relates to improvements in yielding tires which are used on automobile wheels and comprising an outer casing and an inner member, the object of the invention being to provide an inner member or filler of improved construction, which is solid, highly resilient, is not liable to injury by puncture, is very cheap and extremely durable and which may be used instead of the customary inflated or pneumatic inner tube in the outer casing to secure all the desirable qualities of a pneumatic tire, at very much less expense.

The invention consists of an automobile or other vehicle tire filler composed of felt, rubber, glucose and gelatin as hereinafter described and claimed.

The accompanying drawing is a transverse sectional view of a portion of a wheel rim provided with a tire including an outer casing and a filler, the latter being constructed in accordance with my invention.

The wheel felly is indicated at 1, the rim at 2, the check at 3 and the outer tire casing at 4 and the filler or inner tire member at 5.

Within the scope of my invention the inner tire member or filler may be of any suitable size and shape to conform to the casing and also conform to the construction of the rim.

The filler or inner member comprises a core 6 which is made of felt, on which is a relatively thin layer 7 which is composed of 50 per cent. rubber and 25 per cent. each of glucose and gelatin. This layer 7 is applied in the form of a thin sheet around the felt core and is molded in a suitable vulcanizing mold under sufficient pressure and for a suitable length of time to secure the vulcanizing of the particles. An intermediate layer 8 of felt is formed around the compound layer 7. On the outer side of the intermediate felt layer 8 is an intermediate compound layer 9 which is also formed of rubber, glucose and gelatin and is similar to the layer 7. An outer felt layer 10 is formed around the compound layer 9 and on the outer side of the felt layer 10 is an outer compound layer 11 which forms a thin skin or sheet around the filler or inner tire member and is similar to the layers 7—9.

The filler or inner tire member is molded in a suitable vulcanizing mold under sufficient pressure to secure the desired density and then is subjected to a vulcanizing temperature a sufficient length of time to insure the vulcanizing of the particles throughout the filler.

The proportions of the substances within the construction of my improved tire member and compound may be varied within the scope of my invention.

Having thus described my invention, I claim:—

A tire filler comprising a felt core, an inner relatively thin compound layer surrounding the core, an intermediate felt layer formed around the inner compound layer, an intermediate compound layer surrounding the intermediate felt layer, an outer felt layer formed around said intermediate compound layer, an outer compound layer formed on the outer felt layer forming a thin skin or sheet for the same, each of the compound layers consisting of rubber, glucose, and gelatin formed in thin layers, which completely surround the felt layers, and the same as molded under pressure and vulcanized forming a complete tire filler to be inserted in an outer casing or shoe.

In testimony whereof I affix my signature in presence of two witnesses.

RAIDAR S. WICKS.

Witnesses:
 W. L. BRICKEY,
 FRANCES JOHNSTON.